United States Patent
von Haken Spence et al.

(10) Patent No.: US 6,234,950 B1
(45) Date of Patent: May 22, 2001

(54) NITROGEN SUBSTITUTED PHOSPHINIMINE LIGAND

(75) Inventors: Rupert Edward von Haken Spence; Linda Koch; Dusan Jeremic; Stephen John Brown, all of Calgary (CA)

(73) Assignee: Nova Chemicals (International) S.A.

( * ) Notice: Subject to any disclaimer, the term of this patent is extended or adjusted under 35 U.S.C. 154(b) by 0 days.

(21) Appl. No.: 09/439,767

(22) Filed: Nov. 15, 1999

(30) Foreign Application Priority Data

Nov. 26, 1998 (CA) .................................................. 2254841

(51) Int. Cl.$^7$ ....................................................... B01J 31/18
(52) U.S. Cl. ........................ 506/155; 502/103; 502/117; 526/127; 526/161; 526/172; 526/901; 526/943
(58) Field of Search ..................................... 502/155, 103, 502/117; 526/127, 161, 172, 901, 943

(56) References Cited

U.S. PATENT DOCUMENTS

| | | |
|---|---|---|
| 4,543,399 | 9/1985 | Jenkins, III et al. . |
| 4,752,597 | 6/1988 | Turner . |
| 4,808,561 | 2/1989 | Welborn, Jr. . |
| 5,198,401 | 3/1993 | Turner et al. . |
| 5,352,749 | 10/1994 | DeChellis et al. . |
| 5,648,310 | 7/1997 | Wasserman et al. . |
| 5,672,669 | 9/1997 | Wasserman et al. . |
| 5,674,795 | 10/1997 | Wasserman et al. . |
| 5,965,677 * | 10/1999 | Stephan et al. ...................... 526/129 |
| 6,063,879 * | 5/2000 | Stephan et al. ...................... 526/127 |

* cited by examiner

Primary Examiner—David W. Wu
Assistant Examiner—William Cheung
(74) Attorney, Agent, or Firm—Kenneth H. Johnson

(57) ABSTRACT

An organometallic complex of a group 4 metal having a cyclopentadienyl ligand and a heterosubstituted phosphinimine ligand is a catalyst component for olefin polymerization. The heterosubstituted phosphinimine ligand may be conveniently and inexpensively synthesized using readily available precursors which are comparatively non-pyrophoric. The resulting catalysts are highly active for ethylene copolymerization, particularly when activated with an alumoxane or ionic activator.

8 Claims, No Drawings

US 6,234,950 B1

NITROGEN SUBSTITUTED PHOSPHINIMINE LIGAND

FIELD OF THE INVENTION

This invention relates to a catalyst for olefin polymerization. The catalyst is an organometallic complex of a group 4 metal. The catalyst contains a cyclopentadienyl type ligand and a heterosubstituted phosphinimine ligand. The heterosubstituted phosphinimine ligand may be conveniently and inexpensively synthesized and is comparatively non-pyrophoric.

BACKGROUND OF THE INVENTION

Olefin polymerization catalysts having a cyclopentadienyl ligand and a conventional phosphinimine ligand are disclosed in a copending and commonly assigned patent application (Stephen et al). The catalysts of the Stephen et al disclosure are highly active for ethylene (co)polymerization, particularly when used in combination with an alumoxane, or an "ionic activator" (or both).

We have now discovered that heterosubstituted phosphinimine ligands may be easily synthesized and can be used as a component of a highly active ethylene polymerization catalyst system.

SUMMARY OF THE INVENTION

The present invention provides a catalyst component for olefin polymerization comprising an organometallic complex defined by the formula:

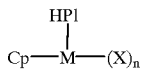

wherein Cp is selected from cyclopentadienyl, substituted cyclopentadienyl, indenyl, substituted indenyl, fluorenyl, and substituted fluorenyl; M is a metal selected from titanium, zirconium and hafnium; X is an activatable ligand and n is selected from 1 and 2; said HPI is a heterosubstituted phosphinimine ligand which is bonded to the metal M and wherein said HPI is defined by the formula:

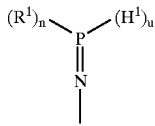

wherein $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, a silyl radical of the formula:

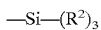

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein $R^2$ is as defined above; and $H^1$ is a heterosubstituent having a nitrogen atom bonded to said phosphorus atom, with the provisos that a=0, 1 or 2, b=1, 2 or 3 and a+b=2 or 3.

Prior art phosphinimines generally involve pyrophoric phosphine precursors in their synthesis. The phosphine precursors of the heterosubstituted phosphinimines used in the present invention mitigate this disadvantage because they may be readily synthesized from less pyrophoric precursors, as illustrated in the examples. This reduces the likelihood of process fires during commercial manufacture of the phosphinimine ligands.

The present catalyst components may be used in combination with an activator to provide an olefin polymerization catalyst system. Alumoxanes, "ionic activators" and/or combinations of the two may be used as activators.

DETAILED DESCRIPTION

1. Description of Catalyst Component

The catalyst components of this invention are defined by the formula:

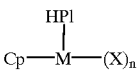

wherein M is a group 4 metal selected from titanium, zirconium and hafnium; HPI is a heterosubstituted phosphinimine ligand (as described in section 1.2); Cp is a cyclopentadienyl ligand (as described in section 1.3); each X is independently an activatable ligand (and each is preferably a simple monoanionic ligand such as an alkyl or halide—as described in section 1.4); and n is 1 or 2 as defined by the formula, depending upon the valence of the metal M and the anionic ligand(s) as described in section 1.4.

Preferred catalysts are monocyclopentadienyl complexes of titanium (IV) having two, monoanionic activatable ligands (i.e. n is 2).

1.2 Heterosubstituted Phosphinimine Ligand

The catalyst component of this invention must contain a heterosubstituted phosphinimine ligand which is covalently bonded to the metal. This ligand is defined by the formula:

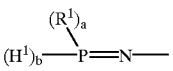

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, a silyl radical of the formula:

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein $R^2$ is as defined above; and $H^1$ is a heterosubstituent.

$H^1$ is a heterosubstituent which is characterized by having a nitrogen atom that is bonded to the phosphorus atom via a single covalent bond. The nitrogen atom is then substituted either with two substituents (which are bonded to the nitrogen via single bonds) or one substituent (bonded to the nitrogen via a double bond). The substituents on the nitrogen atom are not particularly critical to the success of this invention. However, for reasons of cost and convenience, it is preferred that each $R^1$ substituent on the nitrogen atom is independently selected from hydrocarbyl and silyl (and, as will be appreciated by those skilled in the art, the hydrocarbyl and/or silyl substituents may also be substituted). Hydrocarbyl groups, especially tertiary butyl, are particularly preferred $R^1$ substituents. There must be at least one heterosubstituent $H^1$ (i.e. b must be at least 1). The sum of a+b is 3 when all three substituents on the phosphorus atoms are singly bonded to it. Alternatively, the sum of a+b is 2 when one of the substituents is doubly bonded to the phosphorus atom. It is preferred that there are three, singly bonded substituents on the phosphorus atom. It is particularly preferred that a=2 and b=1 (i.e. two of the $R^1$ substituents and one $H^1$ substituent).

1.3 Cyclopentadienyl-type Ligands

As used herein, the term cyclopentadienyl-type ligand is meant to convey its conventional meaning, namely a ligand having a five carbon ring which is bonded to the metal via eta-5 bonding. Thus, the term "cyclopentadienyl-type" includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of $C_{1-10}$ hydrocarbyl radical (which hydrocarbyl substituents are unsubstituted or further substituted); a halogen atom, $C_{1-8}$ alkoxy radical, a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R^2)_3$ wherein each $R^2$ is independently selected from the group consisting of hydrogen, a $C_{1-8}$ alkyl or alkoxy radical $C_{6-10}$ aryl or aryloxy radicals; germanyl radicals of the formula Ge—$(R^2)_3$ wherein $R^2$ is as defined directly above. It is preferred to use an unsubstituted cyclopentadienyl ligand for reason of cost and convenience.

1.4 Activatable Ligand

The term "activatable ligand" refers to a ligand which may be activated by a cocatalyst (also known as an "activator" to facilitate olefin polymerization). Exemplary activatable ligands are independently selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy and aryl oxide radicals may be unsubstituted by or further substituted by a halogen atom, a $C_{1-8}$ alkyl radical, a $C_{1-8}$ alkoxy radical, a $C_{6-10}$ aryl or aryl oxy radical, an amido radical which is unsubstituted or substituted by up to two $C_{1-8}$ alkyl radicals; a phosphido radical which is unsubstituted or substituted by up to two $C_{1-8}$ alkyl radicals.

The number of activatable ligands depends upon the valency of the metal and the valency of the activatable ligand. The preferred catalyst metals are group 4 metals in their highest oxidation state (i.e. 4+) and the preferred activatable ligands are monoanionic. Thus, the preferred catalyst components contain one phosphinimine ligand, one cyclopentadienyl ligand and two (monoanionic) activatable ligands bonded to the group 4 metal. In some instances, the metal of the catalyst component may not be in the highest oxidation state. For example, a titanium (III) component would contain only one monoanionic activatable ligand.

2. Description of Activators (or "Cocatalysts")

The catalyst components described in part 1 above are used in combination with an "activator" (which may also be referred to by a person skilled in the art as a "cocatalyst") to form an active catalyst system for olefin polymerization. Simple aluminum alkyls and alkoxides may provide comparatively weak cocatalytic activity under certain mild polymerization conditions. However, the preferred activators are alumoxanes and so-called ionic activators, as described below.

2.1 Alumoxanes

The alumoxane activator may be of the formula:

$(R^4)_2AlO(R^4AlO)_mAl(R^4)_2$ wherein each $R^4$ is independently selected from the group consisting of $C_{1-20}$ hydrocarbyl radicals and m is from 0 to 50, preferably $R^4$ is a $C_{1-4}$ alkyl radical and m is from 5 to 30. Methylalumoxane (or "MAO") is the preferred alumoxane.

Alumoxanes are well known as activators for metallocene-type catalysts.

Activation with alumoxane generally requires a molar ratio of aluminum in the activator to (group 4) metal in the catalyst from 20:1 to 1000:1. Preferred ratios are from 50:1 to 250:1.

2.2 Ionic Activators

Ionic activators are also well known for metallocene catalysts. See, for example, U.S. Pat. No. 5,198,401 (Hlatky and Turner). These compounds may be selected from the group consisting of:

(i) compounds of the formula $[R^5]^+[B(R^7)_4]^-$ wherein B is a boron atom, $R^5$ is a cyclic $C_{5-7}$ aromatic cation or a triphenyl methyl cation and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^2)_3$; wherein each $R^2$ is independently selected from the group consisting of a hydrogen atom and a $C_{1-4}$ alkyl radical; and (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and (iii) compounds of the formula $B(R^7)_3$ wherein $R^7$ is as defined above.

In the above compounds preferably $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

The "ionic activator" may abstract one or more activatable ligands so as to ionize the catalyst center into a cation but not to covalently bond with the catalyst and to provide sufficient distance between the catalyst and the ionizing activator to permit a polymerizable olefin to enter the resulting active site.

Examples of ionic activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron, tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene (diazonium) tetrakispentafluorophenyl borate,
tropillium phenyltrispentafluorophenyl borate,
triphenylmethylium phenyltrispentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
benzene (diazonium) tetrakis (3,4,5-trifluorophenyl) borate,
tropillium tetrakis (3,4,5-trifluorophenyl) borate,
benzene (diazonium) tetrakis (3,4,5-trifluorophenyl) borate,
tropillium tetrakis (1,2,2-trifluoroethenyl) borate,
triphenylmethylium tetrakis (1,2,2-trifluoroethenyl) borate,
benzene (diazonium) tetrakis (1,2,2-trifluoroethenyl) borate,
tropillium tetrakis (2,3,4,5-tetrafluorophenyl) borate,
triphenylmethylium tetrakis (2,3,4,5-tetrafluorophenyl) borate, and
benzene (diazonium) tetrakis (2,3,4,5-tetrafluorophenyl) borate.

Readily commercially available ionic activators include: N,N-dimethylanilinium tetrakispentafluorophenyl borate, triphenylmethylium tetrakispentafluorophenyl borate, and trispentafluorophenyl borane.

3. Homogeneous or Heterogeneous Catalyst

The catalyst system of this invention is preferably used in a homogeneous form in solution polymerization (where the term "homogeneous" means that the catalyst and cocatalyst/activator are soluble in, or miscible with, the polymerization solvent). However, when the catalyst is employed in a slurry or gas phase polymerization, it is highly preferred to use the catalyst in a heterogeneous or "supported form". It is also highly preferred that the catalyst does not cause reactor fouling. The art of preparing heterogeneous catalysts which do not lead to reactor fouling is not adequately understood, though it is generally accepted that the catalytic material should be very well anchored to the support so as to reduce the incidence of fouling resulting from the deposition of catalyst or cocatalyst which has dissociated from the support.

In general, heterogeneous catalysts may be grouped into three main categories:

3.1. Unsupported Alumoxane/Catalyst Mixtures

These catalysts may be easily prepared by evaporating the solvent or diluent from a liquid mixture of an alumoxane and the catalyst component. The resulting product is a solid at room temperature due to the comparatively high molecular weight of the alumoxane. There are two disadvantages to this approach, namely cost (i.e. alumoxanes are comparatively expensive—and the alumoxane is used as an expensive "support" material) and "reaction continuity/fouling" (i.e. the alumoxane may partially melt under polymerization conditions, leading to reactor instability/fouling). U.S. Pat. No. 4,752,597 (Turner, to Exxon) illustrates this approach for the preparation of a heterogeneous catalyst.

3.2. Metal Oxide Supported Catalysts

These catalysts are prepared by depositing the catalyst component and a cocatalyst on a very porous metal oxide support. The catalyst and cocatalyst are substantially contained within the pore structure of the metal oxide particle. This means that a comparatively large metal oxide particle is used (typically particle size of from 40 to 80 microns). The preparation of this type of supported catalyst is described in U.S. Pat. No. 4,808,561 (Welborn, to Exxon).

3.3. Filled/Spray Dried Catalysts

This method of catalyst preparation is also well known. For example, U.S. Pat. Nos. 5,648,310; 5,674,795 and 5,672,669 (all to Union Carbide) teach the preparation of a heterogeneous catalyst by spray drying a mixture which contains a metallocene catalyst, an alumoxane cocatalyst and a "filler" which is characterized by having a very small particle size (less than one micron) and by being unreactive with the catalyst and cocatalyst. The examples illustrate the use of very fine particle size "fumed" silica which has been treated to reduce the concentration of surface hydroxyls. The resulting catalysts exhibit good productivity. Moreover, they offer the potential to provide a catalyst which is not prone to "hot spots" (as the catalyst may be evenly distributed, at low concentration, throughout the heterogeneous matrix). However, these catalysts suffer from the potential disadvantage of being very friable because they are prepared with a fine, "inert" filler material which does not react with/anchor to the catalyst or cocatalyst.

Friable catalyst particles lead to the formation of "fines" in the polyethylene product, and may also aggravate reactor fouling problems.

An alternative approach is the preparation of spray dried catalysts using a hydrotalcite as a "reactive" filler (as opposed to the unreactive filler described in the above mentioned USP to Union Carbide). This method of catalyst preparation is described in more detail in a commonly assigned patent application. Either approach is suitable for use with the catalysts of this invention.

4. Polymerization Processes

The catalysts of this invention are suitable for use in any conventional olefin polymerization process, such as the so-called "gas phase", "slurry", "high pressure" or "solution" polymerization processes.

The use of a heterogeneous catalyst is preferred for gas phase and slurry processes whereas a homogeneous catalyst is preferred for the solution process.

The polymerization process according to this invention uses ethylene and may include other monomers which are copolymerizable therewith such as other alpha olefins (having from three to ten carbon atoms, preferably butene, hexene or octene) and, under certain conditions, dienes such as hexadiene isomers, vinyl aromatic monomers such as styrene or cyclic olefin monomers such as norbornene.

The present invention may also be used to prepare elastomeric co- and terpolymers of ethylene, propylene and optionally one or more diene monomers. Generally, such elastomeric polymers will contain about 50 to about 75 weight % ethylene, preferably about 50 to 60 weight % ethylene and correspondingly from 50 to 25% of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

The polyethylene polymers which may be prepared in accordance with the present invention typically comprise not less than 60, preferably not less than 70 weight % of ethylene and the balance one or more $C_{4-10}$ alpha olefins, preferably selected from the group consisting of 1-butene, 1-hexene and 1-octene. The polyethylene prepared in accordance with the present invention may be linear low density polyethylene having density from about 0.910 to 0.935 g/cc. The present invention might also be useful to prepare polyethylene having a density below 0.910 g/cc—the so-called very low and ultra low density polyethylenes.

The most preferred polymerization process of this invention encompasses the use of the novel catalysts (together with a cocatalyst) in a medium pressure solution process. As used herein, the term "medium pressure solution process" refers to a polymerization carried out in a solvent for the polymer at an operating temperature from 100 to 320° C. (especially from 120 to 220° C.) and a total pressure of from 3 to 35 mega Pascals. Hydrogen may be used in this process to control (reduce) molecular weight. Optimal catalyst and cocatalyst concentrations are affected by such variables as temperature and monomer concentration but may be quickly optimized by non-inventive tests.

Further details concerning the medium pressure polymerization process are well known to those skilled in the art and widely described in the open and patent literature.

The catalyst of this invention may also be used in a slurry polymerization process or a gas phase polymerization process.

The typical slurry polymerization process uses total reactor pressures of up to about 50 bars and reactor temperature of up to about 200° C. The process employs a liquid medium (e.g. an aromatic such as toluene or an alkane such as hexane, propane or isobutane) in which the polymerization takes place. This results in a suspension of solid polymer particles in the medium. Loop reactors are widely used in slurry processes. Detailed descriptions of slurry polymerization processes are widely reported in the open and patent literature.

In general, a fluidized bed gas phase polymerization reactor employs a "bed" of polymer and catalyst which is fluidized by a flow of monomer which is at least partially gaseous. Heat is generated by the enthalpy of polymerization of the monomer flowing through the bed. Unreacted monomer exits the fluidized bed and is contacted with a cooling system to remove this heat. The cooled monomer is then re-circulated through the polymerization zone together with "make-up" monomer to replace that which was polymerized on the previous pass. As will be appreciated by those skilled in the art, the "fluidized" nature of the polymerization bed helps to evenly distribute/mix the heat of reaction and thereby minimize the formation of localized temperature gradients (or "hot spots"). Nonetheless, it is essential that the heat of reaction be properly removed so as to avoid softening or melting of the polymer (and the resultant-and highly undesirable—"reactor chunks"). The obvious way to maintain good mixing and cooling is to have a very high monomer flow through the bed. However, extremely high monomer flow causes undesirable polymer entrainment.

An alternative (and preferable) approach to high monomer flow is the use of an inert condensable fluid which will boil in the fluidized bed (when exposed to the enthalpy of polymerization), then exit the fluidized bed as a gas, then come into contact with a cooling element which condenses the inert fluid. The condensed, cooled fluid is then returned to the polymerization zone and the boiling/condensing cycle is repeated.

The above-described use of a condensable fluid additive in a gas phase polymerization is often referred to by those skilled in the art as "condensed mode operation" and is described in additional detail in U.S. Pat. No. 4,543,399 and U.S. Pat. No. 5,352,749. As noted in the '399 reference, it is permissible to use alkanes such as butane, pentanes or hexanes as the condensable fluid and the amount of such condensed fluid preferably does not exceed about 20 weight per cent of the gas phase.

Other reaction conditions for the polymerization of ethylene which are reported in the '399 reference are:

Preferred Polymerization Temperatures: about 75° C. to about 115° C. (with the lower temperatures being preferred for lower melting copolymers—especially those having densities of less than 0.915 g/cc—and the higher temperatures being preferred for higher density copolymers and homopolymers); and Pressure: up to about 1000 psi (with a preferred range of from about 100 to 350 psi for olefin polymerization).

The '399 reference teaches that the fluidized bed process is well adapted for the preparation of polyethylene but further notes that other monomers may be employed—as is the case in the process of this invention.

EXAMPLES

The invention will now be illustrated in further detail by way of the following non-limiting examples. For clarity, the Examples have been divided into three parts, namely Part A (Catalyst Component Synthesis), Part B (Solution Polymerization) and Part C (Gas Phase Polymerization).

Polymer Analysis

Gel permeation chromatography ("GPC") analysis was carried out using a commercially available chromatograph (sold under the name Waters 150 GPC) using 1,2,4-trichlorobenzene as the mobile phase at 140° C. The samples were prepared by dissolving the polymer in the mobile phase solvent in an external oven at 0.1% (weight/volume) and were run without filtration. Molecular weights are expressed as polyethylene equivalents with a relative standard deviation of 2.9% and 5.0% for the number average molecular weight (Mn) and weight average molecular weight (Mw), respectively. Melt index (MI) measurements were conducted according to ASTM method D-1238-82.

Polymer densities were measured using pressed plaques (ASTM method D-1928-90), with a densitometer.

The following abbreviations are used in the Examples:

$^t$Bu=tertiary butyl (e.g. $^t$Bu$_3$=tri-tertiary butyl)

Me=methyl

Et=ethyl

Cp*=pentamethylcyclopentadienyl $^1$H NMR=proton nuclear magnetic resonance $^i$Pr=isopropyl Ph=phenyl Mw=weight average molecular weight Mn=number average molecular weight PD=polydispersity (or Mw/Mn)

PE=polyethylene

Cat=catalyst

Hr=hour
M=molar

Part A: Heterosubstituted Phosphinimine
Preparation of N-trimethylsilyl-tris(dimethylamino) phosphinimine, $(Me_2N)_3P=N-SiMe_3$ To a solution of N,N,N',N',N'',N''-hexamethylphosphorimidic triamide, $(Me_2N)_3P=NH$ [1.93 g, 10.8 mmol, Aldrich Chemical Company] in diethyl ether (40 mL) at room temperature was added a hexane solution of n-butyllithium (7.6 mL, 1.6M, 12.16 mmol). After 20 minutes the reaction was cooled to −78° C. and chlorotrimethylsilane (5 mL, 39 mmol) was added. After warming to room temperature the solvent, excess chlorotrimethylsilane and volatile by-product were removed in vacuo and the resulting residue extracted with toluene. After filtering the reaction mixture the toluene was removed in vacuo and the resulting product isolated. Yield=1.951 g. $^1$H NMR (200 MHz, $C_7D_8$): 2.38 (d, J=10.2 Hz, 18H), 0.33 (s, 9H).

Preparation of Cyclopentadienyl(tris(dimethylamino) phosphinimine)titanium dichloride, $[(Me_2N)_3P=N-]TiCpCl_2$ A solution of $(Me_2N)_3P=N-SiMe_3$ (1.95 g, 7.8 mmol) in toluene (10 mL) was added to a slurry of cyclopentadienyltitanium trichloride, $CpTiCl_3$ (1.713 g, 7.8 mmol) in toluene (25 mL). The reaction was then heated to 100° C. for one hour. The yellow reaction mixture was cooled and the volatile components removed in vacuo. The residue was washed with hexane and dried in vacuo to give the product in essentially quantitative yield. $^1$H NMR (200 MHz, $C_7D_8$): 6.38 (s, 5H), 2.26 (d, J=10.4 Hz, 18H). The dimethyl analog of this compound was readily prepared by reaction with MeMgBr in toluene.

Preparation of (dimethylamino)di-t-butylphosphine, $tBu_2(Me_2N)P$

To a slurry of lithiumdimethylamide, $Me_2NLi$ (3.122g, 61.2 mmol) in ether (50 mL) at −78° C. was added a solution of di-t-butylchlorophosphine, $tBu_2PCl$ (5.333 g, 29.5 mmol). The reaction was allowed to warm to room temperature and was then stirred for five days. The reaction was filtered and the solvent removed in vacuo. The resulting residue was vacuum distilled and the resulting distillate collected. Yield=3.268 g, 58%. $^1$H NMR (200 MHz, $C_7D_8$): 2.68 (d, J=7 Hz, 6H), 1.12 (d, J=11.6 Hz, 18H).

Preparation of N-trimethylsilyl-(dimethylamino)di-t-butylphosphinimine, $tBu_2(Me_2N)P=N-SiMe_3$ To $tBu_2(Me_2N)P$ (3.263 g, 17.3 mmol) at 95° C. was added a total of 3.5 mL of trimethylsilyl azide, $Me_3SiN_3$ (26 mmol). After one hour the reaction was cooled and the excess azide removed in vacuo. The phosphinimine product was isolated in essentially quantitative yield. $^1$H NMR (200 MHz, $C_7D_8$): 2.49 (d, J=7.5 Hz, 6H), 1.06 (d, J=13.9 Hz, 18H), 0.34 (s, 9H).

Preparation of Cyclopentadienyl[(dimethylamino)di-t-butylphosphinimine]titanium dichloride, $[tBu_2(Me_2N)P=N-]TiCp*Cl_2$ $tBu_2(Me_2N)P=N-SiMe_3$ (977 mg, 3.54 mmol) and $CpTiCl_3$ (780 mg, 3.54 mmol) were combined and toluene (30 mL) was added. The reaction mixture was heated at 90° C. for 15 minutes and was then cooled. Removal of the volatile components in vacuo gave the product as a yellow solid. Yield=1.26 g, 92%. $^1$H NMR (200 MHz, $C_7D_8$): 6.38 (s,5H), 2.39 (d, J=7.8 Hz, 6H), 1.04 (d, J=14.8 Hz, 18H).

Preparation of Pentamethylcyclopentadienyl[(dimethylamino)di-t-butylphosphinimine]titanium dichloride, $[tBu_2(Me_2N)P=N-]TiCp*Cl_2$ $tBu_2(Me_2N)P=N-SiMe_3$ (527 mg, 1.91 mmol) and $Cp*TiCl3$ (563 mg, 1.95 mmol) were combined and toluene (20 mL) was added. The reaction mixture was heated at 90° C. for 60 minutes and was then cooled. Removal of the volatile components in vacuo gave the product as a solid. Yield=810 mg, 92%. $^1$H NMR (200 MHz, $C_7D_8$): 2.44 (d, J=7.6 Hz, 6H), 2.15 (s, 15H), 1.18 (d, J=14.8 Hz, 18H).

Preparation of Indenyl[(dimethylamino)di-t-butylphosphinimine]titanium dichloride, $[tBu_2(Me_2N)P=N-]Ti(Ind)Cl_2$ $tBu_2(Me_2N)P=N-SiMe_3$ (0.903 g, 3.3 mmol) and $IndTiCl_3$ (0.765 mg, 3.3 mmol) were combined and toluene (30 mL) was added. The reaction mixture was heated at 90° C. for 60 minutes and was then cooled. Removal of the volatile components in vacuo gave the product as a yellow solid. The solid was recrystallized from a toluene and hexane solution. Yield=460 mg. $^1$H NMR (200 MHz, $C_7D_8$): 7.7 (m,2H), 7.2 (m,2H), 6.7 (1H), 6.5 (d, 2H), 2.41 (d, 6H), 1.08 (d, J=15.2 Hz, 18H).

Part B: The Continuous Solution Polymerization

All the polymerization experiments described below were conducted on a continuous solution polymerization reactor. The process is continuous in all feed streams (solvent, monomers and catalyst) and in the removal of product. All feed streams were purified prior to the reactor by contact with various absorption media to remove catalyst killing impurities such as water, oxygen and polar materials as is known to those skilled in the art. All components were stored and manipulated under an atmosphere of purified nitrogen.

All the examples below were conducted in a reactor of 71.5 cc internal volume. In each experiment the volumetric feed to the reactor was kept constant and as a consequence so was the reactor residence time.

The catalyst solutions were pumped to the reactor independently and in some cases were mixed before entering the polymerization reactor (as indicated in the examples). Because of the low solubility of the catalysts, activators and MAO in cyclohexane, solutions were prepared in purified xylene. The catalyst was activated in-situ (in the polymerization reactor) at the reaction temperature in the presence of the monomers. The polymerizations were carried out in cyclohexane at a pressure of 1500 psi. Ethylene was supplied to the reactor by a calibrated thermal mass flow meter and was dissolved in the reaction solvent prior to the polymerization reactor. If comonomer (for example 1-octene) was used it was also premixed with the ethylene before entering the polymerization reactor. Under these conditions the ethylene conversion is a dependent variable controlled by the catalyst concentration, reaction temperature, catalyst activity, etc.

The internal reactor temperature is monitored by a thermocouple in the polymerization medium and can be controlled at the required set point to ±0.5° C. own stream of the reactor the pressure was reduced from the reaction pressure (1500 psi) to atmospheric. The solid polymer was then recovered as a slurry in the condensed solvent and was dried by evaporation before analysis.

The ethylene conversion was determined by a dedicated on line gas chromatograph by reference to propane which was used as an internal standard. The average polymerization rate constant was calculated based on the reactor hold-up time, the catalyst concentration in the reactor and the ethylene conversion and is expressed in l/(mmol*min).

Average polymerization rate $(kp)=(Q/(100-Q))\times(1/[TM])\times(1/HUT)$ where: Q is the percent ethylene conversion.

[TM] is the catalyst concentration in the reactor expressed in mM.

HUT is the reactor hold-up time in minutes.

Example 1

CpTiNP(NMe$_2$)$_3$Me$_2$ was added to the reactor at 18.5× 10$^{-6}$ mol/l along with Ph$_3$C B(C$_6$F$_5$)$_4$ (Asahi Glass) at B/Ti=1.00 (mol/mol). The two components were mixed at room temperature just before entering the polymerization reactor. The reaction temperature was 160° C. and 2.1 gram/min of ethylene was continuously added to the reactor. An ethylene conversion of 97.8% was observed (see table 1).

Example 2

CpTiNP(NMe$_2$)$_3$Me$_2$ was added to the reactor at 4.6×10$^{-6}$ mol/l along with Ph$_3$C B(C$_6$F$_5$)$_4$ (Asahi Glass) at B/Ti=1.00 (mol/mol). The two components were mixed at room temperature just before entering the polymerization reactor. The reaction temperature was 160° C. and 2.1 gram/min of ethylene was continuously added to the reactor. An ethylene conversion of 91.4% was observed (see table 1).

Example 3

CpTiNP(NMe$_2$)$_3$Me$_2$ was added to the reactor at 2.3×10$^{-6}$ mol/l along with Ph$_3$C B(C$_6$F$_5$)$_4$ (Asahi Glass) at B/Ti=1.00 (mol/mol) and MMAO-7 (Akzo-Nobel) at Al/Ti=20.0. The titanium and boron components were mixed at room temperature before entering the reactor and the MMAO-7 was pumped directly to the polymerization reactor. The reaction temperature was 160° C. and 2.1 gram/min of ethylene was continuously added to the reactor. An ethylene conversion of 33.1% was observed (see table 1).

Example 4

CpTiNP(NMe$_2$)$_3$Me$_2$ was added to the reactor at 2.3×10$^{-6}$ mol/l along with Ph$_3$C B(C$_6$F$_5$)$_4$ (Asahi Glass) at B/Ti=1.00 (mol/mol) and MMAO-7 (Akzo-Nobel) at Al/Ti=5.0. The titanium and boron components were mixed at room temperature before entering the reactor and the MMAO-7 was pumped directly to the polymerization reactor. The reaction temperature was 160° C. and 2.1 gram/min of ethylene was continuously added to the reactor. An ethylene conversion of 80.8% was observed (see table 1).

Example 5

CpTiNP(NMe$_2$)$_3$Me$_2$ was added to the reactor at 6.3×10$^{-6}$ mol/l along with Ph$_3$C B(C$_6$F$_5$)$_4$ (Asahi Glass) at B/Ti=1.00 (mol/mol). The two components were mixed at room temperature just before entering the polymerization reactor. The reaction temperature was 160° C. and 2.1 gram/min of ethylene and 3.0 ml/min of 1-octene was continuously added to the reactor. An ethylene conversion of 91.5% was observed (see table 1).

Example 6

CpTiNP(NMe$_2$)$_3$Me$_2$ was added to the reactor at 6.3×10$^{-6}$ mol/l along with Ph$_3$C B(C$_6$F$_5$)$_4$ (Asahi Glass) at B/Ti=1.00 (mol/mol). The two components were mixed at room temperature just before entering the polymerization reactor. The reaction temperature was 160° C. and 2.1 gram/min of ethylene and 5.0 ml/min of 1-octene was continuously added to the reactor. An ethylene conversion of 87.7% was observed (see table 1).

Comparative Example 10C (C$_5$Me$_5$)$_2$ZrCl$_2$ (Strem) was added to the reactor at 37×10$^{-6}$ mol/l along with MMAO-3 (Akzo-Nobel, Al/Ti=400 mol/mol). The reaction temperature was 140° C. and 1.0 gram/min of ethylene was continuously added to the reactor. An ethylene conversion of 55.5% was observed (see table 1).

Comparative Example 11C (C$_5$Me$_5$)$_2$ZrCl$_2$ (Strem) was added to the reactor at 37×10$^{-6}$ moll along with MMAO-3 (Akzo-Nobel, Al/Ti=400 mol/mol). The reaction temperature was 160° C. and 1.0 gram/min of ethylene was continuously added to the reactor. An ethylene conversion of 35.6% was observed (see table 1).

Comparative Example 12C (C$_5$Me$_5$)$_2$ZrCl$_2$ (Strem) was added to the reactor at 37×10$^{-6}$ mol/l along with MMAO-3 (Akzo-Nobel, Al/Ti=400 mol/mol). The reaction temperature was 160° C. and 2.1 gram/min of ethylene was continuously added to the reactor. An ethylene conversion of 37.4% was observed (see table 1).

Comparative Example 13C rac-Et(ind)$_2$ZrCl$_2$ (Witco) was added to the reactor at 37×10$^{-6}$ mol/l along with MMAO-3 (Akzo-Nobel, Al/Ti=400 mol/mol). The reaction temperature was 160° C. and 2.1 gram/min of ethylene was continuously added to the reactor. An ethylene conversion of 94.6% was observed (see table 1).

Comparative Example 14C rac-Et(ind)$_2$ZrCl$_2$ (Witco) was added to the reactor at 37×10$^{-6}$ mol/l along with MMAO-3 (Akzo-Nobel, Al/Ti=400 mol/mol). The reaction temperature was 160° C. and 2.1 gram/min of ethylene and 3.25 ml/min of 1-octene was continuously added to the reactor. An ethylene conversion of 94.8% was observed (see table 1).

TABLE 1

| Example | Total Flow to Reactor (ml/min) | Catalyst Concentration (mol × 10$^6$) | Ethylene Conversion (%) | Calculated Polymerization Rate (kp) (l/mmol × min) | Polymer Density (g/cc) | Polymer Melt Index | Mn × 10$^{-3}$ | Mw × 10$^{-3}$ |
|---|---|---|---|---|---|---|---|---|
| 1 | 27.0 | 18.5 | 97.8 | 907 | — | — | — | — |
| 2 | 27.0 | 4.6 | 91.4 | 861 | 0.950 | 0.11 | 72.3 | 143.1 |
| 3 | 27.0 | 2.3 | 33.1 | 81 | — | — | — | — |
| 4 | 27.0 | 4.6 | 80.8 | 344 | — | — | — | — |

TABLE 1-continued

| Example | Total Flow to Reactor (ml/min) | Catalyst Concentration (mol × $10^6$) | Ethylene Conversion (%) | Calculated Polymerization Rate (kp) (l/mmol × min) | Polymer Density (g/cc) | Polymer Melt Index | Mn × $10^{-3}$ | Mw × $10^{-3}$ |
|---|---|---|---|---|---|---|---|---|
| 5 | 27.0 | 6.3 | 91.5 | 648 | 0.907 | 19.6 | 23.0 | 45.3 |
| 6 | 27.0 | 6.3 | 87.7 | 432 | 0.890 | 22.3 | 26.6 | 46.6 |
| 10C | 27.0 | 37.0 | 55.5 | 13 | — | 880 | 2.7 | 10.0 |
| 11C | 27.0 | 37.0 | 35.6 | 6 | — | — | 1.8 | 7.5 |
| 12C | 27.0 | 37.0 | 37.4 | 6 | — | 620 | 3.3 | 12.0 |
| 13C | 27.0 | 37.0 | 94.6 | 179 | — | 1300 | 3.9 | 14.0 |
| 14C | 27.0 | 37.0 | 94.8 | 186 | 0.925 | very high | 2.6 | 10.0 |

Part C: Gas Phase Polymerization
Catalyst Preparation and Polymerization Testing Using a Semi-Batch, Gas Phase Reactor The preparation methods described below employ typical techniques for the syntheses and handling of air-sensitive materials. Standard Schlenk and drybox techniques were used in the preparation of ligands, metal complexes, support substrates and supported catalyst systems. Solvents were purchased as anhydrous materials and further treated to remove oxygen and polar impurities by contact with a combination of activated alumina, molecular sieves and copper oxide on silica/alumina. Where appropriate, elemental compositions of the supported catalysts were measured by Neutron Activation analysis and a reported accuracy of ±1% (weight basis).

The supported catalysts were prepared by initially supporting MAO on a silica support, followed by deposition of the catalyst component.

All the polymerization experiments described below were conducted using a semi-batch, gas phase polymerization reactor of total internal volume of 2.2L. The reaction gas mixtures (an ethylene/butene mixture containing 4 mole % butene and 96 mole % ethylene) was measured to the reactor on a continuous basis using a calibrated thermal mass flow meter, following passage through purification media as described above. A pre-determined mass of the catalyst sample as added to the reactor under the flow of the inlet gas with no pre-contact of the catalyst with any reagent, such as a catalyst activator. The catalyst was activated in-situ (in the polymerization reactor) at the reaction temperature in the presence of the monomers, using a metal alkyl complex which has been previously added to the reactor to remove adventitious impurities. Purified and rigorously anhydrous sodium chloride was used as a catalyst dispersing agent.

The internal reactor temperature is monitored by a thermocouple in the polymerization medium and can be controlled at the required set point to ±1.0° C. The duration of the polymerization experiment was one hour. Following the completion of the polymerization experiment, the polymer was separated from the sodium chloride and the yield determined.

Table 2 illustrates data concerning the Al/transition metal ratios of the supported catalyst; polymer yield and polymer properties.

TABLE 2

Polymerization Results

| Complex | Mmol complex | Supp.[1] | mg of catalyst | Yield | gPe/g metal[2] | gPe/g catalyst | Al/M Ratio[3] |
|---|---|---|---|---|---|---|---|
| CpTi(Cl$_2$)[N=P(NMe$_2$)$_3$] | 0.1 | 1 g | 42 | 0.1 | 63 | 2 | 98 |
| Cp*Ti(Cl$_2$)[N=P(t-Bu$_2$)NMe$_2$] | 0.1 | 1 g | 39 | 25 | 257465 | 611 | 98 |
| IndTi(Cl$_2$)[N=P(t-Bu$_2$)NMe$_2$] | 0.1 | 1 g | 8 | 10.9 | 302729 | 1363 | 98 |

[1]Support is a commercially available MAO-on-silica (purchased from Witco).
[2]Pe = Polyethylene.
[3]Mole ratio, based on measured titanium levels and Al levels reported by Witco.

What is claimed is:

1. A catalyst component for olefin polymerization comprising an organometallic complex defined by the formula:

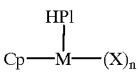

wherein Cp is selected from cyclopentadienyl, substituted cyclopentadienyl, indenyl, substituted indenyl, fluorenyl, and substituted fluorenyl; M is a metal selected from titanium, zirconium and hafnium; X is an activatable ligand and n is selected from 1 and 2; said HPI is a heterosubstituted phosphinimine ligand which is bonded to the metal M, and wherein said HPI is defined by the formula:

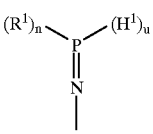

wherein $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, a silyl radical of the formula:

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

$$Ge\text{—}(R^2)_3$$

wherein $R^2$ is as defined above; and $H^1$ is a heterosubstituent having a nitrogen atom bonded to said phosphorus atom, with the provisos that a=0, 1 or 2, b=1, 2 or 3 and a+b=2 or 3.

2. The catalyst component of claim 1 wherein each R is a hydrocarbyl substitutent and n is 2.

3. The catalyst component of claim 1 wherein each R is a tertiary butyl substitutent.

4. The catalyst component of claim 3 wherein M is selected from titanium and zirconium.

5. The catalyst component according to claim 3 wherein M is titanium and Cp is unsubstituted cyclopentadienyl.

6. The catalyst component according to claim 5 wherein n is 2 and each X is independently selected from halogen and an alkyl having from 1 to 4 carbon atoms.

7. An olefin polymerization catalyst system comprising a catalyst component for olefin polymerization comprising I) an organometallic complex defined by the formula:

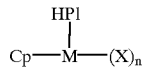

wherein Cp is selected from cyclopentadienyl, substituted cyclopentadienyl, indenyl, substituted indenyl, fluorenyl and substituted fluorenyl; M is a metal selected from titanium, zirconium and hafnium; X is an activatable ligand and n is selected from 1 and 2; said HPI is a heterosubstituted phosphinimine ligand which is bonded to the metal M, and wherein said HPI is defined by the formula:

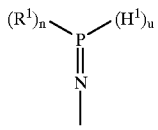

wherein $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, a silyl radical of the formula:

$$\text{—Si—}(R^2)_3$$

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

$$Ge\text{—}(R^2)_3$$

wherein $R^2$ is as defined above; and $H^1$ is a heterosubstituent having a nitrogen atom bonded to said phosphorus atom, with the provisos that a=0, 1 or 2, b=1, 2 or 3 and a+b=2 or 3; and II) an activator.

8. The olefin polymerization catalyst system of claim 7 wherein said activator is selected from the group consisting of an alumoxane, an ionic activator and mixtures thereof.

* * * * *